(12) United States Patent
Koseoglu et al.

(10) Patent No.: US 12,515,205 B2
(45) Date of Patent: Jan. 6, 2026

(54) HYDROCRACKING CATALYST, ITS METHOD OF MAKING, AND METHOD OF USE

(71) Applicants: Saudi Arabian Oil Company, Dhahran (SA); JGC Catalysts and Chemicals Ltd., Kanagawa (JP)

(72) Inventors: Omer Refa Koseoglu, Dhahran (SA); Robert Peter Hodgkins, Dhahran (SA); Hiroyuki Seki, Kanagawa (JP); Shigeyuki Nagano, Kanagawa (JP)

(73) Assignees: Saudi Arabian Oil Company, Dhahran (SA); JGC Catalysts and Chemicals Ltd., Kanagawa (JP)

( * ) Notice: Subject to any disclaimer, the term of this patent is extended or adjusted under 35 U.S.C. 154(b) by 168 days.

(21) Appl. No.: 18/480,934

(22) Filed: Oct. 4, 2023

(65) Prior Publication Data

US 2025/0114774 A1 Apr. 10, 2025

(51) Int. Cl.
*C10G 47/20* (2006.01)
*B01J 29/08* (2006.01)
(Continued)

(52) U.S. Cl.
CPC ........... *B01J 29/088* (2013.01); *B01J 35/617* (2024.01); *C01B 39/026* (2013.01);
(Continued)

(58) Field of Classification Search
CPC .............. B01J 2029/081; B01J 2229/16; B01J 2229/18; B01J 2229/183; B01J 2229/37; B01J 29/088; B01J 29/89; B01J 35/617; B01J 37/0213; C01B 39/026; C01B 39/065; C01P 2002/84; C10G 47/02; C10G 47/16; C10G 47/20
See application file for complete search history.

(56) References Cited

U.S. PATENT DOCUMENTS 9,221,036 B2   12/2015   Koseoglu et al.
10,293,332 B2   5/2019   Koseoglu et al.
(Continued)

FOREIGN PATENT DOCUMENTS

WO   WO-2021067119 A1 *   4/2021   .......... B01J 29/7007
WO   2022025957 A1        2/2022

OTHER PUBLICATIONS

Notification of Transmittal of the International Search Report and the Written Opinion of the International Searching Authority, or the Declaration dated Dec. 2, 2024 pertaining to International application No. PCT/US2024/049700 filed Oct. 3, 2024, pp. 1-12.

*Primary Examiner* — Ellen M Mcavoy
*Assistant Examiner* — Chantel Graham
(74) *Attorney, Agent, or Firm* — DINSMORE & SHOHL LLP (57) ABSTRACT

A hydrocracking catalyst comprises an active cracking support. The active cracking support comprises a post-modified zeolite framework having zirconium atoms and titanium atoms substituting for aluminum atoms; wherein: a portion of the zirconium atom are substituted in the post-modified zeolite via 4-coordination; a portion of the zirconium atom are grafted to the post-modified zeolite via 5-coordination; and the titanium atoms are substituted in the post-modified zeolite framework via 4-coordination.

20 Claims, 4 Drawing Sheets

(51) Int. Cl.
*B01J 35/61* (2024.01)
*C01B 39/02* (2006.01)
*C01B 39/06* (2006.01)

(52) U.S. Cl.
CPC ............ *C01B 39/065* (2013.01); *C10G 47/20* (2013.01); *B01J 2029/081* (2013.01); *B01J 2229/16* (2013.01); *B01J 2229/183* (2013.01); *B01J 2229/37* (2013.01); *C01P 2002/84* (2013.01)

(56) References Cited

U.S. PATENT DOCUMENTS

| | | |
|---|---|---|
| 2016/0051972 A1 | 2/2016 | Koseoglu et al. |
| 2021/0077985 A1 | 3/2021 | Hodkins et al. |
| 2021/0246381 A1 | 8/2021 | Koseoglu |
| 2021/0246382 A1 | 8/2021 | Koseoglu |
| 2021/0246383 A1 | 8/2021 | Koseoglu |
| 2021/0246384 A1 | 8/2021 | Koseoglu |
| 2021/0246385 A1 | 8/2021 | Koseoglu |
| 2021/0246386 A1 | 8/2021 | Koseoglu |
| 2021/0246387 A1 | 8/2021 | Koseoglu |
| 2021/0246388 A1 | 8/2021 | Koseoglu |
| 2021/0246389 A1 | 8/2021 | Koseoglu |

\* cited by examiner

HYDROCRACKING CATALYST, ITS METHOD OF MAKING, AND METHOD OF USE

TECHNICAL FIELD

The present disclosure relates to zeolites, and more particularly, to zeolites used as components of hydrocracking catalysts.

BACKGROUND

Catalysts including hydrotreating/hydrocracking catalysts, such as pretreat catalysts, typically comprise an amorphous based catalyst(s), such as amorphous alumina or silica-alumina or titania substrates containing active metals, Ni/Mo, Ni/W or Co/Mo metals as the active phase, or amorphous catalyst, zeolite catalyst, or a composite mixture thereof, promoted with Ni, W, Mo and Co metals. A commonly used zeolite is USY. The hydrocracking cracking catalysts include a hydrogenative-active metal component and an acidic support component. In certain embodiments, hydrocracking catalyst includes any one of amorphous alumina catalysts, amorphous silica-alumina catalysts, titania catalysts natural or synthetic zeolite based catalyst, a post modified zeolite, or a combination thereof. The hydrocracking catalyst can possess an active phase material including, in certain embodiments, any one of or combination including Ni, W, Mo, Co or a combination thereof. In other embodiments, typically in sulfur-free environments for hydrogenation and/or reforming, the catalyst may include one or more noble metals such as Ru, Rh, Pd, Ag, Os, Ir. Pt, or Au. In certain embodiments in which an objective is hydrodenitrogenation, acidic alumina or silica alumina based catalysts loaded with Ni—Mo, or Ni—W active metals, or combinations thereof, are used. In embodiments in which the objective is to remove all nitrogen and to increase the conversion of hydrocarbons, silica alumina, zeolite or combination thereof are used as catalysts, with active metals including Ni—Mo, Ni—W or combinations thereof.

Hydroprocessing (hydrotreating and hydrocracking) catalysts can be manufactured by a variety of methods. The method chosen usually represents a balance between manufacturing cost and the degree to which the desired chemical and physical properties are achieved. Although there is a relationship between catalyst formulation, preparation procedure, and catalyst properties, the details of that relationship are not always well understood due to the complex nature of the catalyst systems. The chemical composition of the catalyst plays a critical role in its performance; the physical and mechanical properties also play a major role. The preparation of hydrocracking catalysts involves several steps: precipitation, filtration (decantation, centrifugation), washing, drying, forming, calcination, and impregnation. Other steps, such as kneading/mulling, grinding, and sieving, are also typically required. Described below are the steps that are an integral part of hydrocracking catalyst manufacturing processes.

Precipitation involves the mixing of solutions or suspension of materials, resulting in the formation of a precipitate, which may be crystalline or amorphous. Kneading/mulling of wet solid materials usually leads to the formation of dough that is subsequently formed and dried. The kneaded/mulled product is subjected to thermal treatment in order to obtain a more intimate contact between components and better homogeneity by thermal diffusion and solid-state reactions. The metal component is subsequently added by impregnation or incipient wetting methods.

The support characteristics determine the mechanical properties of the catalyst, such as attrition resistance, hardness, and crushing strength. High surface area and proper pore-size distribution are generally required. The pore-size distribution and other physical properties of a catalyst support prepared by precipitation are also affected by the precipitation and the aging conditions of the precipitate as well as by subsequent drying, forming, and calcining.

The final shape and size of catalyst particles are determined in the manufacturing step. Catalysts and catalyst supports are formed into several possible shapes such as spheres, cylindrical extrudates, or shaped forms such as a trilobes or a quadrilobes. Spherical catalyst support catalyst can be obtained by "oil dropping," whereby precipitation occurs upon the pouring of a liquid into a second immiscible liquid. Other spherical processes include marmurizing. Generally, because of cost and process considerations such as pressure drop, the majority of catalysts are currently formed in shapes other than spheres. Fewer spherical catalysts are used in modern hydrocracking. Non spherical shapes are obtained by mixing raw materials to form an extrudable dough which is extruded through a die with perforations. The spaghetti extrudate is dried, calcined, and broken into short pieces. The typical length to diameter ratio of the catalyst base varies, for instance, between 2 and 4.

Typical hydrocracking catalyst manufacturing steps include: mixing and kneading a binder component and a zeolite component; extruding the kneaded composite mixture and forming into composite particles; calcining the composite particles; impregnating the calcined composite particles with an active metal component; and calcining the impregnated composite particles to form the final catalyst product.

Examples of the shapes of the catalysts and catalyst supports include cylindrical, trilobes, twisted trilobes, and quadrilobes. Catalysts with multilobed cross sections have a higher surface-to-volume ratio than simple cylindrical extrudates. When used in a fixed bed, these shaped catalyst particles help reduce diffusion resistance, create a more open bed, and reduce pressure drop.

Thermal treatment is typically applied either before and/or after impregnation of the formed catalyst. For catalyst support materials prepared by precipitation or co-mulling of all the components, only drying may be required prior to forming, with subsequent calcination of the formed product. Thermal treatment of the catalyst or support eliminates water and other volatile matter. The drying and calcination conditions are of critical importance in determining the physical as well as catalytic properties of the catalyst support material. Surface area, pore-size distribution, stability, attrition resistance, crush strength, and the catalytic activity are affected by the drying and calcination conditions.

In conventional catalyst preparation, several methods may be used to add the active metals to the catalyst support material: (a) immersion (dipping), (b) incipient wetness, and (c) evaporative. In one method, a calcined catalyst support material is immersed in an excess of solution containing active metals or metal compounds. The solution fills the pores and is also adsorbed on the support surface, and excess solution is removed. In another method, impregnation is carried out using incipient wetness by tumbling or spraying the activated support with a volume of solution having a concentration of metal compound tailored to achieve the targeted metal level, equal to or slightly less than the pore volume of the support. The metal-loaded catalyst support material is then dried and calcined. Metal oxides are formed in the process; the calcination step is also referred to as oxidation. In another method, evaporative impregnation, the catalyst support material is saturated with water or with acid solution and immersed into the aqueous solution containing the metal compound. That compound subsequently diffuses into the pores of the catalyst support material through the aqueous phase. The catalyst after calcination are bagged and shipped-out to the final destinations.

BRIEF SUMMARY

When zeolites are used as an active cracking support for hydrocracking catalysts, the zeolites may be post-modified through the inclusion of titanium and zirconium atoms. Generally, those titanium and zirconium atoms are four-coordinated in the framework of the zeolite. However, these post-modified zeolites may have different acidity levels and can over or under-crack hydrocarbon feeds, changing the product selectivity. Accordingly, zeolites which include Ti and Zr with different acidity levels are desired. Embodiments of the present disclosure meet this need by providing post-modified zeolites (and their methods of making and use) where the Zr is 4-coordinated and 5-coordinated to the zeolite framework and the Ti is 4-coordinated to the zeolite framework. This coordination structure is believed to provide different acidity which may, in some applications, result in the increased production of middle distillates. Further embodiments provide methods of making and methods of using the zeolites.

According to some embodiments of the present disclosure, a hydrocracking catalyst comprises an active cracking support. The active cracking support comprises a post-modified zeolite framework having zirconium atoms and titanium atoms substituting for aluminum atoms; wherein: a portion of the zirconium atom are substituted in the post-modified zeolite via 4-coordination; a portion of the zirconium atom are grafted to the post-modified zeolite via 5-coordination; and the titanium atoms are substituted in the post-modified zeolite framework via 4-coordination.

According to some embodiments of the present disclosure, a method of producing an active cracking support comprises providing an acidified zeolite suspension comprising a zeolite framework; introducing a titanium compound to the acidified zeolite suspension to isomorphically substitute titanium via 4-coordination onto the zeolite framework, thereby producing a titanium substituted zeolite framework; and then introducing a zirconium compound to the titanium substituted zeolite framework to graft a portion of the zirconium atoms onto the zeolite framework via 5-coordination, and isomorphically substitute a portion of the zirconium atoms via 4-coordination onto the zeolite framework, thereby producing the active cracking support.

According to some embodiments of the present disclosure, a method of hydrocracking a hydrocarbon feed comprises contacting the hydrocarbon feed with hydrogen and a hydrocracking catalyst under hydrocracking conditions; wherein the hydrocracking catalyst comprises an active cracking support; the active cracking support comprises a post-modified zeolite framework having zirconium atoms and titanium atoms substituting for aluminum atoms. A portion of the zirconium atoms are grafted to the post-modified zeolite framework via 5-coordination. A portion of the zirconium atoms are 4-coordinated in the post-modified zeolite framework. The titanium atoms are 4-coordinated in post-modified zeolite framework.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

Reference will now be made in greater detail to various aspects, some of which are illustrated in the accompanying drawings.

DETAILED DESCRIPTION

Embodiments of the present disclosure provide post-modified zeolites where the Zr is 4-coordinated and 5-coordinated to the zeolite framework and the Ti is 4-coordinated to the zeolite framework. This coordination structure is believed to provide different acidity to the embedded Zr atoms. Further embodiments of the present disclosure are directed to the production and use of such zeolites.

Definitions

"C" refers to degrees Celsius.

"Catalyst" refers to any substance that increases the rate of a specific chemical reaction, such as but not limited to cracking reactions.

"Cracking" refers to a chemical reaction where a molecule having carbon-carbon bonds is broken into more than one molecule by the breaking of one or more of the carbon-carbon bonds or a cyclic moiety having carbon-carbon bonds is converted to a non-cyclic moiety by the breaking or one or more of the carbon-carbon bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

"$m^2/g$" refers to square meters per gram.

"min" refers to minutes.

"mL/g" refers to milliliters per gram.

"mm" refers to millimeters.

"wt. %" refers to weight percent.

Some aspects of the present disclosure are directed to producing a hydrocracking catalyst having an active cracking support which includes a zeolite. Embodiments of the present disclosure are directed to manufacturing a hydrocracking catalyst for hydrocracking hydrocarbon oil, such as vacuum gas oil (VGO) and deasphalted oil (DAO). The hydrocracking of the hydrocarbon oil with the present hydrocracking catalyst may give middle distillates (e.g., kerosene and gas oil) or similar compounds. The hydrocracking catalyst may facilitate diffusion of hydrocarbon oils (e.g., VGO and DAO) into mesopores to obtain the middle distillates or similar hydrocarbons.

The hydrocracking catalyst of the present disclosure may be suitable for hydrocracking a heavy hydrocarbon oil obtained from crude oil, synthetic crude oil, bitumen, oil sand, shell oil, bio oil, bio mass, plastic derived oil or coal liquid. The above heavy hydrocarbon oil may comprise one or more of a naphtha, a vacuum gas oil (VGO), a deasphalted oil (DAO) obtained from a solvent deasphalting process, a demetallized oil, a light coker gas oil or heavy coker gas oil obtained from a coker process, a cycle oil obtained from a fluid catalytic cracking (FCC) process, or a gas oil obtained from a visbreaking process.

The Hydrocracking Catalyst

The present hydrocracking catalyst may comprise an active cracking support. In embodiments, the active cracking support may carry a hydrogenative component, such as a hydrogenative metal. Further embodiments of the present hydrocracking catalyst may comprise a binder.

The active cracking support may comprise a post-modified zeolite framework. The post-modified zeolite framework may comprise titanium atoms and zirconium atoms, and optionally hafnium atoms. The titanium atoms and a portion of the zirconium atoms may isomorphically substitute aluminum atoms in the zeolite framework via 4-coordination. A portion of the zirconium atoms may also be grafted to the zeolite framework via 5-coordination. The hafnium atoms may be isomorphically substituted for aluminum atoms in the zeolite framework.

The zeolite framework of the active cracking support may be framework-substituted (post-modified) in that some of the aluminum atoms constituting the zeolite framework are replaced with titanium atoms and some are replaced with zirconium atoms, and optionally, some are replaced with hafnium atoms. Thus, titanium atoms and zirconium atoms (and optionally hafnium atoms) form part of the framework to give a post-modified zeolite framework.

A portion of the zirconium atoms may be grafted to the zeolite framework via 5-coordination (i.e. have a coordination number of 5). The coordination number of an atom refers to the number of atoms bonded to it. In the zeolite framework, coordination number may be determined by ultraviolet-visible (UV-Vis) spectroscopy; near-infrared (NIR) spectroscopy; Fourier transform infrared (FTIR) spectroscopy; and X-ray crystallography, such as X-ray absorption fine structure (XAFS). At least 25 wt. %, at 50 wt. %, at least 80 wt. %, at least 90 wt. %, at least 95 wt. %, at least 99 wt. %, or even at least 99.99 wt. % of the zirconium atoms may be 5-coordinated to the zeolite framework.

A portion of the zirconium atoms may be 4-coordinated (i.e. have a coordination number of 4) to the zeolite framework. In embodiments, the 4-coordinated zirconium atoms may be isomorphically substituted for aluminum atoms in the zeolite framework. The substitution may be verified, for example, by ultraviolet-visible (UV-Vis) spectroscopy; near-infrared (NIR) spectroscopy; Fourier transform infrared (FTIR) spectroscopy; and X-ray crystallography, such as X-ray absorption fine structure (XAFS). At least 25 wt. %, at least 40 wt. %, at least 50 wt. %, at least 80 wt. %, at least 90 wt. %, at least 95 wt. %, at least 99 wt. %, or even at least 99.99 wt. % of the zirconium atoms may be 4-coordinated to the post-modified zeolite framework.

The post-modified zeolite framework may comprise from 0.1 wt. % to 5 wt. % of zirconium atoms, on the basis of the total weight of the post-modified zeolite framework. In embodiments, the post-modified zeolite framework may comprise from 0.2 wt. % to 5 wt. %, from 0.5 wt. % to 5 wt. %, from 1 wt. % to 5 wt. %, from 2.5 wt. % to 5 wt. %, from 0.1 wt. % to 2.5 wt. %, from 0.1 wt. % to 1 wt. %, from 0.2 wt. % to 4 wt. %, or 0.3 wt. % to 3 wt. %, or any subset thereof of the zirconium atoms, on the basis of the total weight of the post-modified zeolite framework.

The titanium atoms are 4-coordinated (i.e. have a coordination number of 4) to the zeolite framework. In embodiments, the titanium atoms are isomorphically substituted for aluminum atoms in the zeolite framework. The substitution may be verified, for example, by ultraviolet-visible (UV-Vis) spectroscopy; near-infrared (NIR) spectroscopy; Fourier transform infrared (FTIR) spectroscopy; and X-ray crystallography, such as X-ray absorption fine structure (XAFS). At least 80 wt. %, at least 90 wt. %, at least 95 wt. %, at least 99 wt. %, or even at least 99.99 wt. % of the titanium atoms may be 4-coordinated to the post-modified zeolite framework.

The post-modified zeolite framework may comprise from 0.1 wt. % to 5 wt. % of titanium atoms, on the basis of the total weight of the post-modified zeolite framework. In embodiments, the post-modified zeolite framework may comprise from 0.2 wt. % to 5 wt. %, from 0.5 wt. % to 5 wt. %, from 1 wt. % to 5 wt. %, from 2.5 wt. % to 5 wt. %, from 0.1 wt. % to 2.5 wt. %, from 0.1 wt. % to 1 wt. %, from 0.2 wt. % to 4 wt. %, or 0.3 wt. % to 3 wt. %, or any subset thereof of the titanium atoms, on the basis of the total weight of the post-modified zeolite framework.

When hafnium is present, hafnium atoms may be 4-coordinated (i.e. have a coordination number of 4) to the zeolite framework. In embodiments, the 4-coordinated hafnium atoms may be isomorphically substituted for aluminum atoms in the zeolite framework. The substitution may be verified, for example, by ultraviolet-visible (UV-Vis) spectroscopy; near-infrared (NIR) spectroscopy; Fourier transform infrared (FTIR) spectroscopy; and X-ray crystallography, such as X-ray absorption fine structure (XAFS). At least 25 wt. %, at least 40 wt. %, at least 50 wt. %, at least 80 wt. %, at least 90 wt. %, at least 95 wt. %, at least 99 wt. %, or even at least 99.99 wt. % of the hafnium atoms may be 4-coordinated to the post-modified zeolite framework.

The titanium atom content and the zirconium atom content of the framework-substituted zeolite can be measured, for example, with an X-ray fluorescence analyzer, a high-frequency plasma-emission spectrometer, and an atomic absorption spectrometer.

The post-modified zeolite framework may include any zeolite framework suitable for use in a hydrocracking catalyst. In embodiments, the post-modified zeolite framework may be BEA or FAU, such as Y zeolite. In specific embodiments, the zeolite framework may be USY.

The unmodified zeolite may give predetermined ranges for certain properties of the post-modified zeolite framework. These properties may include, for example, a crystal lattice constant, a specific surface area, and a molar ratio (silica-alumina ratio) of silica (silicon dioxide or $SiO_2$) to alumina (aluminum oxide or $Al_2O_3$). Properties of the post-modified zeolite framework are given below. In addition, discussion of these properties, their numerical ranges and verification, testing equipment, and other features are given in U.S. Pat. No. 9,221,036, which is incorporated by reference herein in its entirety for all purposes.

The post-modified zeolite framework may have a crystal lattice constant (or lattice parameter) in the range of 2.430 to 2.450 nanometers (nm) or in the range of 2.435 nm to 2.445 nm. The post-modified zeolite framework may have a specific surface area in the range of 600 square meter per gram ($m^2/g$) to 900 $m^2/g$, such as from 650 $m^2/g$ to 800 $m^2/g$. The specific surface-area value is determined by the Brunauer-Emmett-Teller (BET) technique employing nitrogen adsorption.

The post-modified zeolite framework may have a silica-to-alumina molar ratio (SAR) of at least 3, such as at least 5, at least 12, at least 20, at least 40, from 1 to 200, from 5 to 150, from 5 to 100, from 12 to 100, from 20 to 100, from 40 to 100, from 60 to 100, from 20 to 80, from 20 to 60, or any subset thereof. The SAR is the molar ratio of silicon dioxide ($SiO_2$) to aluminum (III) oxide ($Al_2O_3$). Without being limited by theory, the stability of a Y-zeolite may generally increase as some aluminum ions or sodium ions are removed from the Y-zeolite to give an ultra-stable Y-zeolite. An ultra-stable Y-zeolite has greater stability than the conventional Y-zeolite. The phrase "ultra-stable Y-zeolite" is referred to herein as "USY".

The crystallinity may be considered. Crystallinity is typically determined by x-ray diffraction. A particular diffraction peak can be selected and its intensity normalized. Zeolites can be analyzed and the diffraction intensity normalized against the standard. If the acid treatment was too aggressive, the structural integrity of the zeolite framework would decrease (more amorphous material being generated), and thus crystallinity would decrease. Hence, if the relative crystallinity is maintained after the acid/heteroatom incorporation treatment, this may confirm that the structure of the zeolite is not only maintained but is maintained at a degree of crystallinity.

The post-modified zeolite framework may have pores having a diameter of 600 angstrom (Å) or less. The pores may have a volume in the range of 0.40 milliliter per gram (mL/g) to 0.75 mL/g, or 0.45 mL/g to 0.70 mL/g. The pore volume is determined from pore distribution obtained by calculating and analyzing desorption data of nitrogen by the BJH (Barrett, Joyner, and Halenda) method.

The post-modified zeolite framework may be mixed with a binder, typically an inorganic oxide, and formed into a desired shape (typically a form of extrudate), which is normally dried and fired to provide the active cracking support for the hydrocracking catalyst. The binder material may comprise an inorganic oxide component. The inorganic oxide may comprise a porous inorganic oxide. In embodiments, the porous inorganic oxide may comprise alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

The post-modified zeolite framework may comprise at least 80 wt. %, such as at least 90 wt. %, at least 95 wt. %, at least 99 wt. %, at least 99.9 wt. % or even at least 99.999 wt. % of silicon, aluminum, titanium, zirconium, and oxygen atoms, based on the total weight of the post-modified zeolite framework.

The hydrocracking catalyst may comprise a hydrogenative metal. The hydrogenative metal may be introduced into the hydrocracking catalyst by a co-mulling process or an impregnation process.

In the co-mulling process, the active cracking support, the binder, and the hydrogenative metals may be combined and subsequently extruded. In the impregnation process, the active cracking support, the binder, or both may be impregnated with the hydrogenative metal as an active phase metal, and then dried and fired to provide the hydrocracking catalyst. In a typical impregnation process, the active cracking support and the binder are mixed and extruded to form an extrudate, then the extrudate may be impregnated with the hydrogenative metal.

The hydrogenative metal may comprise any metal which gives hydrogenation functionality. In addition to hydrogenation functionality, the hydrogenative metal may also have hydrodesulfurization functionality and hydrodenitrogenation functionality. The hydrogenative metal may be active phase metals. The hydrogenative metal may be in metallic form, oxide form, sulfide form, or a combination thereof. In specific embodiments, at least a portion of the hydrogenative metal may be in sulfide form.

The hydrogenative metal may include metal components (cobalt, nickel palladium, platinum) in IUPAC group 8 of the long periodic table or metal components (molybdenum, or tungsten) in IUPAC group 6, or both. In embodiments, the hydrogenative metal may comprise one or more non-noble metals selected from the group consisting of cobalt, nickel, molybdenum, or tungsten. Particular examples of the metal component include combinations of molybdenum or tungsten in group 6 and cobalt or nickel in group 8. Other particular examples include noble metal components of the platinum group, such as platinum, rhodium, or palladium. In the case of molybdenum, tungsten, cobalt or nickel, an amount may be in a range of 0.1% to 30% by mass in terms of oxide based on mass of the catalyst. In the case of the platinum group (platinum, rhodium, or palladium), an amount may be, for example, in a range of 0.01% to 2% by mass in terms of metal based on mass of the catalyst.

The hydrocracking catalyst may comprise from 0.1 wt. % to 40 wt. % of the hydrogenative component, such as the hydrogenative metal, based on the total weight of the hydrocracking catalyst. In embodiments, the hydrocracking catalyst may comprise from 0.1 wt. % to 30 wt. %, from 0.1 wt. % to 20 wt. %, from 0.1 wt. % to 10 wt. %, from 0.1 wt. % to 5 wt. %, from 0.1 wt. % to 1 wt. %, from 1 wt. % to 40 wt. %, from 5 wt. % to 40 wt. %, from 10 wt. % to 40 wt. %, from 20 wt. % to 40 wt. %, from 30 wt. % to 40 wt. %, from 1 wt. % to 30 wt. %, from 5 wt. % to 20 wt. %, or any subset thereof of the hydrogenative component, such as the hydrogenative metal, based on the total weight of the hydrocracking catalyst.

Method of Making the Hydrocracking Catalysts

A method of making the hydrocracking catalyst described herein is graphically illustrated in FIG. 1 and described below. Special attention will be given to the modification process, whereby the Ti and Zr are substituted into the zeolite framework.

Steps 102 to 118 provide a description of a process for the synthesis of a calcined USY zeolite (denoted as USY (c) herein). Steps 120 to 128 provide a description of the process for the preparation of a post-modified zeolite framework (incorporation of the Ti and Zr heteroatoms). Steps 130 to 144 provide a description of a process for converting the post-modified zeolite framework into the hydrocracking catalyst. It should be understood that in some embodiments, the zeolite of any of steps 102 to 118 may be purchased and thus the end user may be able to begin at any of steps 102 to 118. Additionally, when the starting zeolite is of BEA framework type, the user may skip the synthesis of the USY zeolite.

First, a starting zeolite is provided. The starting zeolite may be in sodium form or in ammonia form. The starting zeolite may include any zeolite framework suitable for use in a hydrocracking catalyst. In embodiments, the zeolite framework may be BEA or FAU, such as Y zeolite. In specific embodiments, the zeolite framework may be USY.

In embodiments, the starting FAU zeolite may have an effective $SiO_2/Al_2O_3$ molar ratio (SAR), in the range of about 3 to 6; an effective unit cell dimension (UD) of about 2.430 nanometers (nm) to 2.450 nm, and an effective specific surface area (SA) in the range of about 600 square meters per gram ($m^2/g$) to 900 $m^2/g$. 600 $m^2/g$ to 800 $m^2/g$. 650 $m^2/g$ to 900 $m^2/g$, or 650 $m^2/g$ to 800 $m^2/g$.

At step 102, a suspension of the sodium form of the starting zeolite may be prepared by combining the sodium form of the starting zeolite, such as Y-type zeolite (Na—Y). The Na—Y suspension may have a liquid/solid ratio range of about 5-20, 5-15, 8-15, 5-12 or 8-12 liters (L) of water per kilogram (kg) of zeolite, and a temperature, for instance in a range of about 15° C. to 95° C., 15° C. to 80° C., 20° C. to 95° C., 20° C. to 90° C., 20° C. to 80° C., 40° C. to 95° C., 40° C. to 90° C., or 40° C. to 80° C. The sodium form of the starting zeolite may have an effective $Na_2O$ content, for instance of about 13% by mass.

In step 104, a first ion-exchanged zeolite is synthesized by subjecting the sodium form zeolite suspension from step 102 to the ion exchange of sodium ions with ammonium ions, thereby preparing the first ion-exchanged zeolite ($NH_4$—Y). In the first ion exchanged zeolite, about 50% to 70% of Na contained in the sodium form zeolite is substituted with $NH_4$.

Step 104 may include addition to the sodium form zeolite suspension of: an effective concentration of an ammonium source, for instance a molar ratio of ammonium to Al in the range of about 2-8; at an effective temperature in a range of about 15° C. to 95° C., 15° C. to 80° C., 20° C. to 95° C., 20° C. to 90° C., 20° C. to 80° C., 40° C. to 95° C., 40° C. to 90° C., or 40° C. to 80° C.; and for an effective residence time, for instance in a range of about 10 min to 600 min, 10 min to 180 min, 30 min to 600 min, or 30 min to 180 min. The ammonium source can be one or more of $NH_4OH$, $(NH_4)_2SO_4$, $(NH_4)_2CO_3$, or another suitable ammonium source.

The resulting solids from the ion exchange step 104 can be filtered, washed with water at an effective temperature, for instance in a range of about 20° C. to 95° C., 20° C. to 90° C., 20° C. to 80° C. 40° C. to 95° C., 40° C. to 90° C., 40° C. to 80° C., or any subset thereof, and dried at an effective temperature, for example in a range of about 80° C. to 180° C., or 100° C. to 180° C., for an effective residence time, for instance in a range of about 30 minutes (min) to 1800 min, 60 min 1800 min, 30 min to 600 min, or 60 min to 600 minutes, to obtain the first ion-exchanged zeolite.

Optionally, after washing the resulting solids from the ion exchange step 104, they can be washed in one or more additional cycles with an ammonium source followed by water washing, at effective temperatures, concentrations and residence times such as those at step 104. The solids matter that is washed one or more additional times is dried at effective temperatures and residence times such as those at step 104, to obtain the first ion-exchanged zeolite. In certain instances, the one or more additional cycles of the first ion exchange step are not implemented.

In a thermal treatment step 106, a hydrogen type zeolite may be synthesized from the first ion-exchanged zeolite by heating the first ion-exchanged zeolite in a saturated steam atmosphere. In embodiments the thermal treatment at step 106 may comprise calcining the first ion-exchanged zeolite at an effective temperature and for a time effective to produce H-zeolite, for instance with a temperature in a range of about 500° C. to 800° C., 500° C. to 700° C., 600° C. to 800° C., 600° C. to 700° C., or any subset thereof (typically in the presence of steam, that is, in a saturated water vapor, or in the presence of air or oxygen) and for a time range of about 10 min to 600 min, 10 min to 180 min, 30 min to 600 min, 30 min to 180 min, or any subset thereof. In embodiments, if there remains a substantial amount of Na in the H-zeolite, ion exchange may be repeated one or more times.

In embodiments where the starting zeolite is Y-type zeolite, the H-zeolite is the hydrogen form of the Y-type zeolite (HY-zeolite). The HY-zeolite may be converted to USY zeolite following additional ammonium ion exchange and steaming treatment discussed below at steps 108 to 112. At steps 108 to 112, the HY-type zeolite is treated to synthesize a second ion-exchanged $NH_4$—Y-zeolite having 80% to 97% of the Na contained in the Na-zeolite exchanged with $NH_4$, also referred to as $NH_4^{80-97}$—Y-zeolite. As depicted at step 108, a suspension may be prepared containing an effective concentration of HY-zeolite, for instance in a liquid/solid ratio range of about 5 L/kg to 20 L/kg, 5 L/kg to 15 L/kg, 8 L/kg to 15 L/kg. 5 L/kg to 12 L/kg, 8 L/kg to 12 L/kg, or any subset thereof (water/zeolite), and at an effective temperature, for instance in a range of about 15° C. to 95° C., 15° C. to 80° C., 20° C. to 95° C., 20° C. to 90° C., 20° C. to 80° C., 40° C. to 95° C., 40° C. to 90° C., 40° C. to 80° C., or any subset thereof.

In an ion exchange step 110, a second ion-exchanged zeolite is synthesized by subjecting the HY-zeolite suspension from step 108 to ion exchange of 80% to 97%, or 90% to 97% sodium ions of the Na-zeolite with ammonium ions to prepare a second ammonium-exchanged zeolite (second $NH_4$-zeolite). An embodiment of the ion exchange at step 110 includes addition and stirring of an effective concentration of an ammonium, for instance a molar ratio of ammonium to Al in the range of about 2 to 8; at an effective temperature in a range of about 20° C. to 95° C., 20° C. to 90° C. 20° C. to 80° C., 40° C. to 95° C., 40° C. to 90° C., 40° C. to 80° C., or any subset thereof; and for an effective residence time, for instance in a range of about 10 min to 600 min, 10 min to 180 min, 30 min to 600 min, 30 min to 180 min, or any subset thereof. The ammonium source can be one or more of $NH_4OH$, $(NH_4)_2SO_4$, $(NH_4)_2CO_3$, or another suitable ammonium source.

The resulting solids from the ion exchange step 110 can be filtered, washed with water at an effective temperature, for instance in a range of about 0° C. to 95° C., 20° C. to 90° C., 20° C. to 80° C., 40° C. to 95° C., 40° C. to 90° C., 40° C. to 80° C., or any subset thereof, and dried at an effective temperature, for example in a range of about 80° C. to 180° C. or 100° C. to 180° C., for an effective residence time, for instance in a range of about 30 min to 1800 min, 60 min to 1800 min, 30 min to 600 min, 60 min to 600 min, or any subset thereof, to obtain the second ion-exchanged $NH_4$-zeolite.

Optionally, after washing the resulting solids from the ion exchange step 110, they can be washed in one or more additional cycles with an ammonium source followed by water washing, at effective temperatures, concentrations and residence times such as those at step 110. The solids washed one or more additional times are dried at effective temperatures and residence times such as those at step 110, to obtain the second ion-exchanged $NH_4$-zeolite. In certain instances, the one or more additional cycles of the second ion exchange step are not implemented.

In a thermal treatment step 112, an ultra-stable zeolite, such as a USY zeolite, referred to herein as USY (a), may be synthesized by calcining the $NH_4$-zeolite. Thermal treatment at step 112 may comprise calcining the second ion-exchanged NH$_4$-zeolite at an effective temperature, for instance in a range of about 500° C. to 800° C., 500° C. to 700° C., 600° C. to 800° C., or 600° C. to 700° C. (typically in the presence of steam, that is, in a saturated water vapor, or in the presence of air or oxygen) and for a time range of about 10 min to 600 min, 10 min to 180 min, 30 min to 600 min, or 30 min to 180 min, to recover USY (a). In embodiments the thermal treatment 112 of the NH$_4$-zeolite may be by steaming.

The USY (a) from step 112 may be an ultra-stable zeolite that possesses a SAR that is approximately equivalent to that of the starting zeolite. The steps 102 to 112 are not expected to significantly change the SAR value, because these steps to not entail acid treatment to target ejection of aluminum atoms from the zeolite framework. For example, the USY (a) (such as a USY) thus obtained at step 112 may have a SAR of about 3 to 6.

At steps 114 to 118, the USY (a) zeolite is treated to synthesize calcined USY zeolite having an increased SAR, which is the starting material for subsequent post-framework modification. At step 114, an aqueous suspension may be prepared containing an effective concentration of the USY (a), for instance in a liquid/solid ratio range of about 5-20, 5-15, 8-15, 5-12 or 8-12 L/kg (water/zeolite), and at an effective temperature, for instance in a range of about 15° C. to 95° C., 15° C. to 80° C., 20° C. to 95° C., 20° C. to 90° C., 20° C. to 80° C., 40° C. to 95° C., 40° C. to 90° C., or 40° C. to 80° C.

In an acid treatment step 116, an effective quantity of an inorganic acid or an organic acid is dispersed in the suspension so that a pH of the suspension may be maintained in a strongly acidic range to synthesize a second ultra-stable zeolite (such as a second USY zeolite), referred to herein as USY (b), having an increased SAR. Extra skeletal aluminum (aluminum atoms which do not form part of the zeolite framework) may be removed from the USY (a) in order to obtain the USY (b) zeolite. This is carried out by acid treatment.

The inorganic acid used can generally be sulfuric acid, nitric acid, hydrochloric acid and the like. In embodiments the selected inorganic acid is sulfuric acid or hydrochloric acid. Further, carboxylic acids can suitably be used as the organic acid. The amount of the inorganic acid or the organic acid added may be the amount suitable to control the pH of the suspension in a strongly acidic range, for instance in a range of about 0.7-2.5, 0.7-2.0, 1.0-2.5 or 1.0-2.0. The amount may be, for example, a 0.5-4.0-fold, 0.5-3.5-fold, 0.7-4.0-fold or 0.7-3.5-fold molar increase based on an amount of Al$_2$O$_3$ in the USY (a). The acidic suspension may be maintained at an effective temperature, for instance 15° C. to 95° C., 15° C. to 80° C., 20° C. to 95° C., 20° C. to 90° C., 20° C. to 80° C., 40° C. to 95° C., 40° C. to 90° C., or 40° C. to 80° C. and maintained for an effective residence time, for instance in a range of about 10 min to 600 min, 10 min to 180 min, 30 min to 600 min, or 30 min to 180 min. Acid treatment at step 116 may increase the SAR of the zeolite, for example, from a range of about 3-6 to a range of at least 12, such as from 12 to 100, 20 to 100, 30 to 100, 40 to 100, 30 to 80, or 40 to 80.

The resulting solids from the acid treatment step 116 can be filtered, washed with water at an effective temperature, for instance in a range of about 15° C. to 95° C., 15° C. to 80° C., 20° C. to 95° C., 20° C. to 90° C., 20° C. to 80° C., 40° C. to 95° C., 40° C. to 90° C., or 40° C. to 80° C., and dried at an effective temperature, for example in a range of about 80-180° C. or 100-180° C., for an effective residence time, for instance in a range of about 30 min to 1800 min, 60 min to 1800 min, 30 min to 600 min, or 60 min to 600 min, to recover USY (b).

Optionally, after washing the resulting solids from the acid treatment step 116, they can be treated in one or more additional cycles with an inorganic acid or organic acid followed by water washing, at effective temperatures, concentrations and residence times such as those at step 116. The solids which are acid-treated one or more additional times may be dried at effective temperatures and residence times such as those at step 116, to recover USY (b). In embodiment, the one or more additional cycles of the first acid treatment step are not implemented.

In a thermal treatment step 118, the USY (b) zeolite may be subjected to thermal treatment to prepare a third ultra-stable zeolite, USY (c). In embodiments the thermal treatment at step 118 may comprise calcining the second USY zeolite (USY (b)) at effective temperatures, for example in a range of about 500° C. to 700° C., 550° C. to 700° C., 500° C. to 650° C., or 550° C. to 650° C. (typically in the presence of air or oxygen, or in the presence of steam), and for a time range of about 10 min to 600 min, 10 min to 180 min, 30 min to 600 min, or 30 min to 180 min, to recover USY (c). If the calcining temperature is lower than about 500° C., the framework substitution amount of zirconium atom and/or titanium atoms and/or hafnium atoms tends to be reduced; at calcining temperatures that exceed about 700° C., the specific surface area of the ultra-stable zeolite (such as USY) can be reduced, and a framework substitution amount of zirconium atom and/or titanium atoms and/or hafnium atoms is thus reduced.

At steps 120 to 128, heteroatom inclusion may be carried out to produce the post-modified zeolite framework having a portion of the aluminum atoms within the zeolite framework substituted with zirconium and/or titanium and/or hafnium atoms, whereby the Zr substituted heteroatoms are 4- and 5-coordinated to the zeolite framework and the Ti atoms are 4-coordinated to the zeolite framework. The zeolite framework used at step 120 may be the USY zeolite produced in step 118, a USY zeolite supplied separately, a BEA zeolite. In embodiments, a post-modified zeolite framework material may be produced by firing a zeolite having the properties described herein at about 500° C. to 700° C. A suspension may be formed containing the fired zeolite, the suspension having a liquid/solid ratio of about 5-15 L/kg. An inorganic acid or an organic acid may be added so that a pH of the suspension is about <2.0. Then, a solution containing a titanium compound is mixed. Subsequently a solution containing a zirconium compound is mixed to the acidified zeolite suspension which includes the titanium compound. The solution is neutralized with, for example, an aqueous ammonia, so that the pH of the mixed solution is about 7-7.5.

Suitable zirconium compounds include one or more of zirconium sulfate, zirconium nitrate, zirconium chloride, and the like. In embodiments, zirconium sulfate and/or zirconium nitrate are selected. The quantity of the zirconium compound added is generally from about 0.1 wt. % to 5.0 wt. %, such as from about 0.1 wt. % to 4.0 wt. %, from about 0.1 wt. % to 3.0 wt. %, from about 0.2 wt. % to 5.0 wt. %, from about 0.2 wt. % to 4.0 wt. %, from about 0.2 wt. % to 3.0 wt. %, from about 0.3 wt. % to 5.0 wt. %, from about 0.3 wt. % to 4.0 wt. %, or from about 0.3 wt. % to 3.0 wt. %, as calculated on an oxide basis (that is, zirconium oxide) and as measured relative to the mass of the post-modified zeolite framework. Addition of the zirconium compound in an amount of less than about 0.1 wt. % may fail to improve solid acid characteristics of the zeolite. The addition of the zirconium compound in an amount exceeding 5 wt. % may tend to cause clogging of pores of the zeolite. An aqueous solution of a zirconium compound prepared by dissolving the zirconium compound in water may be used as the zirconium compound.

Suitable titanium compounds include one or more of titanium sulfate, titanium acetate, titanium chloride, titanium nitrate, and titanium lactate. In certain embodiments titanium sulfate and/or titanium acetate are selected. The quantity of the titanium compound added is generally about 0.1 wt. % to 5.0 wt. %, such as from about 0.1 wt. % to 4.0 wt. %, from about 0.1 wt. % to 3.0 wt. %, from about 0.2 wt. % to 5.0 wt. %, from about 0.2 wt. % to 4.0 wt. %, from about 0.2 wt. % to 3.0 wt. %, from about 0.3 wt. % to 5.0 wt. %, from about 0.3 wt. % to 4.0 wt. %, or from about 0.3 wt. % to 3.0 wt. %, as calculated on their oxide basis (that is, titanium oxide) and as measured relative to the mass of the post-modified zeolite framework component. It is believed that the addition of the titanium compound in an amount of less than about 0.1 wt. % may fail to improve solid acid characteristics of the zeolite. It is believed that the addition of the titanium compound in an amount exceeding 5 wt. % may tend to cause clogging of pores of the zeolite. An aqueous solution of a titanium compound prepared by dissolving the titanium compound in water can be used as the titanium compound.

Where present, suitable hafnium compounds include hafnium chloride, hafnium nitrate, hafnium fluoride, hafnium bromide, hafnium oxalate, and the like. The amount of the hafnium compound added is 0.1% to 5% by mass (or 0.2% to 4% by mass) on a hafnium oxide basis with respect to the USY-30 122. The addition of the hafnium compound in an amount of less than 0.1° A by mass may not improve a solid acid of the zeolite. The addition of the hafnium compound in an amount exceeding 4% by mass may increase the cost of the catalyst.

A pH of the suspension may be controlled to about <2.0 to prevent a precipitate from being generated during mixing of the aqueous solution of the zirconium compound and/or the hafnium compound and/or the titanium compound with a suspension of the ultra-stable zeolite (such as USY).

Mixing of the aqueous solutions of the individual zirconium compound, and titanium compound, by sequential addition, with a suspension of the ultra-stable zeolite (such as USY) is, in certain embodiments, conducted by gradually adding the Ti solution to the suspension before the addition of the Zr solution. The time interval between the addition of the Ti aqueous metal solution and the Zr aqueous metal solution to the suspension may be at least 0.1 hr., at least 0.25 hr., at least 0.5 hr., at least 1 hr., at least 2.5 hr., at least 5 hr., from 0.1 hr. to 5 hr., such as from 0.5 hr. to 5 hr., from 1 hr. to 5 hr., or any subset thereof. After all of the solutions have been added, the suspension may be mixed by stirring. In embodiments, the stirring may occur at room temperature (about 25° C. to 35° C.) for about 3 hr. to 5 hr. Further, after completion of the above-described mixing, the admixed solution may be neutralized by adding an alkali compound, such as aqueous ammonia, so that a pH thereof is controlled to about 7.0 to 7.5, thereby obtaining the post-modified zeolite framework of the present disclosure.

It is believed that this sequential addition step causes the zirconium atom to be 4 and 5-coordinated to the zeolite framework and the titanium atoms to be 4-coordinated to the zeolite framework. Without being limited by theory, it is believed that if both the Ti and Zr atoms are introduced at the same time, both the Ti and Zr atoms will be 4-coordinated to the zeolite framework. However, it is believed that if the Ti atoms are introduced first, they will preferentially occupy the 4-coordinated locations. Then, as most of the 4-coordinated locations are taken, the subsequent Zr atoms will be forced to occupy a higher proportion of 5-coordinated locations.

The resulting framework-substituted zeolite can be filtered, if desired, washed with water, and dried at about 80° C. to 180° C.; the mixture may be quasi-equilibrated with steam, for instance, at a temperature of from about 600° C. to 800° C. for about 10 hr. to 20 hr.

At step 120, the calcined USY (c) zeolite from step 118 may be prepared for acid treatment by forming a suspension of an effective concentration USY (c), for instance in a liquid/solid ratio range of about 5-15, 5-12, 8-15 or 8-12 L/kg (water/zeolite), by dispersion in water at an effective temperature, for example, in the range of about 15° C. to 95° C. 15° C. to 80° C., 20° C. to 95° C., 20° C. to 90° C. 20° C. to 80° C., 40° C. to 95° C., 40° C. to 90° C., or 40° C. to 80° C.

In an acid treatment step 122, an effective quantity of an inorganic acid or an organic acid may be dispersed in the suspension so that a pH of the suspension is maintained in a strongly acidic range to prepare the zeolite for metal inclusion, steps 124 to 128.

The inorganic acid used may include sulfuric acid, nitric acid, hydrochloric acid and the like. In embodiments, the inorganic acid may be sulfuric acid, hydrochloric acid, or both. Further, carboxylic acids can suitably be used as the organic acid. The amount of the inorganic acid and/or the organic acid added may be an amount suitable to control the pH of the suspension in a strongly acidic range, for instance in a range of less than 2.0, about 0.7 to 2.5, 0.7 to 2.0, 1.0 to 2.5, or 1.0 to 2.0. The acidic suspension may be maintained at an effective temperature, for instance in the range of about 15° C. to 95° C., 15° C. to 80° C., 20° C. to 95° C., 20° C. to 90° C., 20° C. to 80° C., 40° C. to 95° C., 40° C. to 90° C., or 40° C. to 80° C., and maintained for an effective residence time, and maintained for an effective residence time, for instance in a range of about 10 min to 600 min, 10 min to 180 min, 30 min to 600 min, or 30 min to 180 min.

In metal modification steps 124 and 126, the metal inclusion is carried out. The acid-modified USY (c) zeolite (such as USY zeolite) suspension may be subjected to metals treatment to allow for metal inclusion within the ultra-stable zeolite.

In embodiments, this may be carried out by adding to the acidity modified USY (c) a solution containing transition metal compounds in steps. In embodiments the transition metal compounds may comprise a zirconium compound and a titanium compound, and optionally a hafnium compound. Each metal modification is carried-out in single step. Titanium may be added in step 124. Zirconium may be added in step 126. All the solutions are maintained at an effective temperature, such as 15° C. to 80° C., 15° C. to 60° C., 15° C. to 35° C., 15° C. to 30° C., 20° C. to 60° C., or 20° C. to 30° C., and for an effective residence time, for instance in a range of about 10 min to 600 min, 10 min to 180 min, 30 min to 600 min, or 30 min to 180 min. The suspension from step 126 may be neutralized, such as with an aqueous ammonia, to a pH in the range of about 7.0 to 7.5.

The resulting solids from the metal insertion step 124 and 126 may be filtered, washed with water at an effective temperature, for instance in a range of about 15° C. to 95° C., 15° C. to 80° C., 20° C. to 95° C., 20° C. to 90° C., 20° C. to 80° C., 40° C. to 95° C., 40° C. to 90° C., or 40° C. to 80° C., and dried at an effective temperature, for example in a range of about 80° C. to 180° C. or 100° C. to 180° C., for an effective residence time, for instance in a range of about 30 min to 1800 min, 60 min to 1800 min, 30 min to 600 min, or 60 min to 600 min, and the post-framework modified zeolite (such as USY (A)) may be recovered at step 128.

The post-modified zeolite with the heteroatom inclusion as described herein incorporates zirconium and titanium with Zr atoms grafted to the framework being 4- and 5-coordinated. Effective concentrations of the Zr and Ti include about 0.1-5.0, 0.1-4.0, 0.1-3.0, 0.2-5.0, 0.2-4.0, 0.2-3.0, 0.3-5.0, 0.3-4.0 or 0.3-3.0 wt. %, as calculated on their oxide basis (that is, $ZrO_2$ and $TiO_2$) and as measured relative to the mass of the post-framework modified USY zeolite. In certain embodiments, the amounts of individual materials supplying Zr and Ti can be less than 0.1, 0.2 or 0.3 wt. %, but when combined, the total is at least 0.1, 0.2 or 0.3 wt. %. It is appreciated by a person of skill in the art, that when the framework-substituted zeolite in the catalyst contains the zirconium atom and the titanium atoms described above, a mass ratio (in terms of oxides) of the zirconium atoms to the titanium atoms is not specifically be restricted, and any ratio of zirconium or titanium that is effective for the intended use of the catalyst particles can be used, for example, for hydrocracking of heavy hydrocarbon oil.

The presence of the zirconium atoms and titanium atoms which substitute the framework aluminum atoms with the Zr atoms being in 4- and 5-coordination structures to the zeolite framework serve as constituents of the newly modified zeolite. The modification may be verified by extended X-ray absorption fine structure spectroscopy, X-ray fluorescence, high frequency plasma emission spectrometry, atomic absorption spectrometry, ultraviolet-visible-near-infrared spectrophotometry (UV-Vis-NIR), Fourier transform infrared spectroscopy (FT-IR), and/or nuclear magnetic resonance spectrometry (NMR).

The next steps in the process for producing catalyst particles having active metal components on a composite support including the post modified zeolite and a binder, steps 130 and 132, comprise forming an inorganic oxide as a binder or granulating agent, which is subsequently combining with the post modified zeolite and extruded, steps 134 and 136. At step 130, a solution is prepared that will precipitate into the one or more inorganic oxides used as the binder or granulating agent, hereinafter the inorganic oxide component. For example, a suitable binder can be prepared from a gel of alumina or another inorganic oxide as is known in the art. In certain embodiments, solid inorganic oxides can be used directly as the binder materials.

Alternatively, a commercially available inorganic oxide component can be provided, as is known to those skilled in the art, and prepared for mixing with the post-modified zeolite, for example by kneading.

An inorganic oxide, such as a porous inorganic oxide used in hydrocracking or other catalyst compositions in the related art may be used as the binder. Suitable inorganic oxides may include alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

The post modified zeolite and the inorganic binder may be combined to form the composite support material with known processes for forming catalysts, for example, by mixing and kneading the components (step 134), then forming them into the desired shapes by coextruding or otherwise forming composite support particles (step 136). The composite support particles may be calcined (step 138), and the active metal component may be impregnated in the calcined composite support particles (step 140). The catalyst particles may then be calcined again (step 142) and the final product, the catalyst particles having active metal components on a composite support, may be recovered. In embodiments, the post-modified zeolite material in the final particles may serve as an active catalytic material in addition to the impregnated active metal component of the catalyst particle.

The composite support material may be formed of the post modified zeolite material, for example from step 128 herein, one or more inorganic oxide components (for example from step 132 herein), and optionally one or more other zeolitic materials. The composite support material generally has a surface area in the range of about 150 $m^2/g$ to 500 $m^2/g$. 150 $m^2/g$ to 450 $m^2/g$. 200 $m^2/g$ to 500 $m^2/g$. 200 $m^2/g$ to 450 $m^2/g$, 300 $m^2/g$ to 450 $m^2/g$, or any subset thereof, and a pore volume in the range of about 0.4 mL/g to 0.8 mL/g. 0.4 mL/g to 0.75 mL/g, 0.4 mL/g to 0.65 mL/g, 0.45 mL/g to 0.8 mL/g. 0.45 mL/g to 0.75 mL/g, 0.45 mL/g to 0.65 mL/g, or any subset thereof. The content of the post-modified USY zeolite component, the inorganic oxide component, and the active metal component are appropriately determined according to the object. For example, the post modified zeolite content of the hydrocracking catalyst formed with the composite support material may be in the range of about 0.1 wt. % to 99 wt. %, 0.1 wt. % to 90 wt. %, 0.1 wt. % to 80 wt. %, 0.1 wt. % to 70 wt. %, 2 wt. % to 99 wt. %, 2 wt. % to 90 wt. %, 2 wt. % to 80 wt. %, 2 wt. % to 70 wt. %, 2 wt. % to 100 wt. %, 20 wt. % to 90 wt. %, 20 wt. % to 80 wt. %, 20 wt. % to 70 wt. %, or any subset thereof. The remaining content of the hydrocracking catalyst may be the inorganic oxide and the active metal component, and in embodiments optionally one or more other zeolitic materials.

In the mixing/kneading step 134, post modified zeolite, for instance recovered from step 128 or otherwise provided, and the inorganic binder for instance recovered from step 132 or otherwise provided, are mixed together. The mixing is at effective ratios as noted above, and at a suitable temperature, for example, in the range of about 15° C. to 80° C., 15° C. to 60° C., 15° C. to 35° C., 15° C. to 30° C., 20° C. to 60° C., or any subset thereof. The mixture may be kneaded/mulled with an effective amount of water, for instance, at a liquid/solid ratio range of about 30-80 L/kg, for an effective kneading/mulling time, for instance in a range of about 10 min to 180 min. Therefore, the kneading/mulling of the wet solid materials forms a dough that is subsequently formed and dried. The kneaded/mulled product can be subjected to thermal treatment in order to obtain a more intimate contact between components and better homogeneity by thermal diffusion and solid-state reactions.

The kneaded/mulled material thus obtained is extruded, forming step 136, through a die with an effective cross-sectional shape and dimension, and at a suitable temperature, for example, in the range of about 15° C. to 80° C., 15° C. to 60° C., 15° C. to 35° C., 15° C. to 30° C., 20° C. to 60° C., or any subset thereof. Effective cross-sectional shapes include, for instance, cylindrical, trilobe, twisted trilobe, or quadrilobe. Effective cross-sectional dimensions include, for instance, a diameter or effective diameter in the range of about 0.8 millimeters (mm) to 3.2 mm, or 0.8 mm to 2.5 mm. The resulting extrudates are dried at an effective temperature, for example in a range of about 80° C. to 180° C. or 100° C. to 180° C., for an effective residence time, for instance in a range of about 30 min to 1800 min, 60 min to 1800 min, 30 min to 600 min, or 60 min to 600 min, to recover dried composite extrudates. Optionally, the separate drying step can be avoided, whereby the composite extrudates are passed to a thermal treatment step 138 for calcination.

In the thermal treatment step 138, the composite extrudates (optionally dried) are subjected to thermal treatment to prepare calcined composite particles. In embodiments, the thermal treatment at step 138 comprises calcining the composite extrudates (optionally dried) at effective temperatures (typically in the presence of air or oxygen, or in the presence of steam), for example in a range of about 400° C. to 800° C., 400° C. to 700° C., 400° C. to 650° C., 500° C. to 800° C., 500° C. to 700° C., 500° C. to 650° C., 550° C. to 800° C., 550° C. to 700° C., 550° C. to 650° C., 600° C. to 800° C., or 600° C. to 700° C., and for a time range of about 10 min to 600 min, 10 min to 180 min, 30 min to 600 min, or 30 min to 180 min, to recover calcined composite particles.

The final product, calcined support of the hydrocracking catalyst particles has impregnated therein an active metal component, such as a hydrogenative metal. The active metal component can include one or more metals or metal compounds (oxides or sulfides) known in the art of hydrocracking, including those selected from the Periodic Table of the Elements IUPAC Groups 6, 7, 8, 9 and 10. In certain embodiments the active metal components include those effective as hydrocracking catalysts such as one or more of Mo, W, Co or Ni (oxides or sulfides). In certain embodiments, active metal components include those effective as hydrogenation and/or reforming catalysts (typically in sulfur-free environments) such as one or more noble metals such as Pt, Pd, Rh, Re, Ir, or a combination of such noble metals. The metal component may be contained in catalyst in effective concentrations. For example, total active metal content in hydrocracking catalysts can be present in an amount as is known in the related art, for example about 0.01 wt. % to 40 wt. % in terms of metal, oxide or sulfide. In the case of non-noble metals, including Mo, W, Co, Ni, or combinations thereof, an effective total active metal content can be about 0.1 wt. % to 40 wt. %, or 3 wt. % to 40 wt. %, in terms of oxide or sulfide based on a mass of the catalyst. In the case of noble metals, typically in sulfur-free environments for hydrogenation and/or reforming, an effective total active metal content can be in about 0.01 to 2% by mass in terms of metal.

Figure 1:
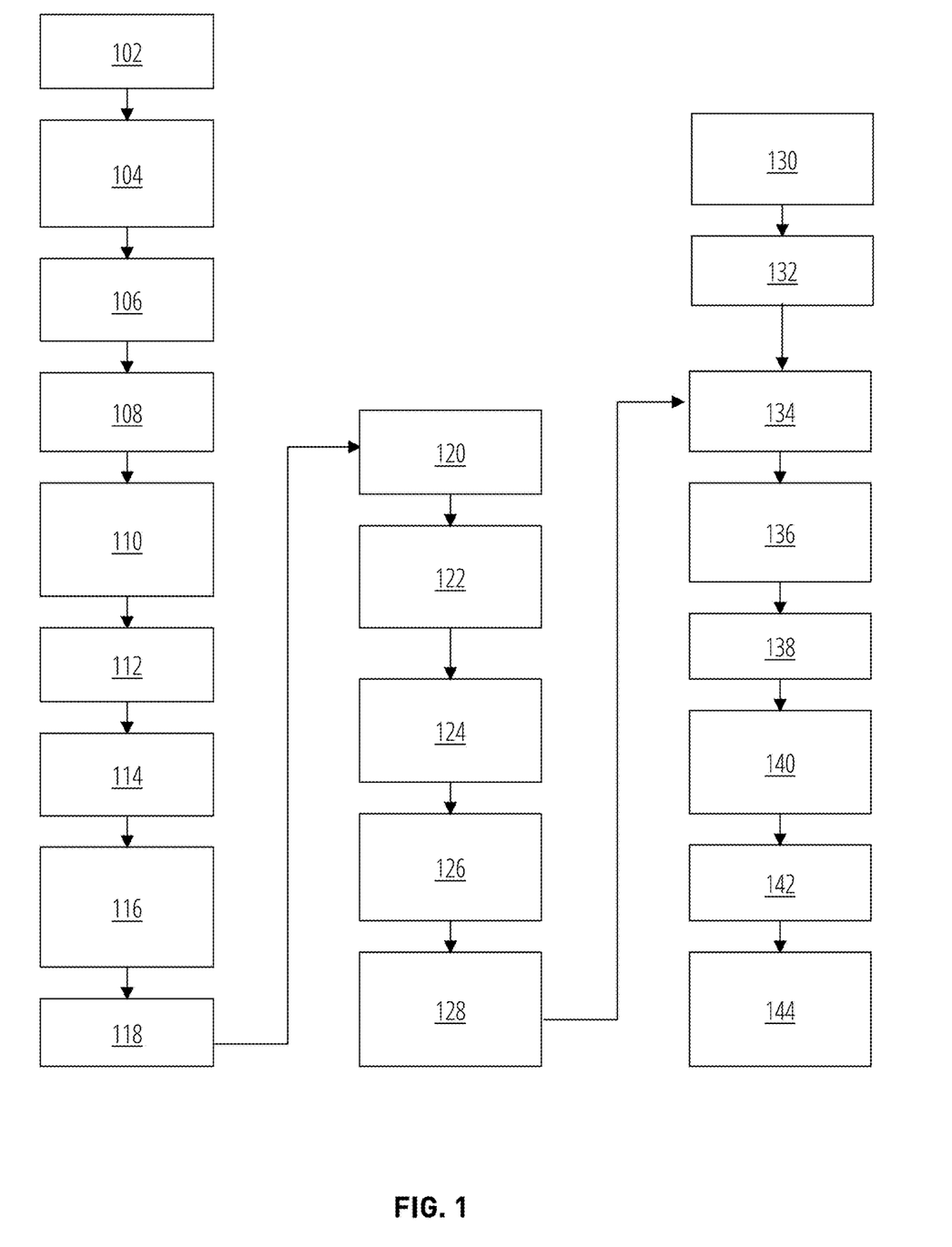
FIG. 1 is a flow-chart which illustrates a method of making post-modified zeolites which include 4-coordinated and 5-coordinated Zr and 4-coordinated Ti, in accordance with some embodiments of the present disclosure.

At the active metal component impregnation step 140 in the embodiment of FIG. 1, the active metal component is impregnated. Several methods can be used to add the active metal component(s) to the support, including but not limited to immersion, incipient wetness, and evaporative. In the most commonly used method, a calcined support is immersed in an excess of an aqueous solution containing active metals or metal compounds. The solution fills the pores and is also adsorbed on the support surface, and excess solution is removed. In another method, impregnation is carried out using incipient wetness by tumbling or spraying the activated support with a volume of solution having a concentration of metal compound tailored to achieve the targeted metal level. In another method, evaporative impregnation, the support is saturated with water or with acid solution and immersed into the aqueous solution containing the metal compound. That compound subsequently diffuses into the pores of the support through the aqueous phase. The metal-loaded support is then dried and calcined, forming metal oxides.

In embodiments, the active metal component impregnation step 140 comprises immersing the calcined composite support particles, formed of the post-modified zeolite and a binder, in an aqueous solution containing active metal components. The quantity and concentration of the aqueous solution containing active metal components is dependent on the desired quantity of the active metal components to be loaded on the composite support particles. In certain embodiments of the above methods, the volume of the active metal solution is equal to or slightly less than the pore volume of the support. The solution may be maintained at an effective temperature, for instance about 40° C. to 100° C., 40° C. to 99° C., 60° C. to 100° C., 60° C. to 99° C., 60° C. to 97° C., 70° C. to 99° C. 70° C. to 97° C., 80° C. to 99° C., 80° C. to 97° C., or 90° C. to 99° C. and for an effective residence time, for instance in a range of about 40 min to 1200 min, 40 min to 600 min, 40 min to 360 min, 60 min to 1200 min, 60 min to 600 min, 60 min to 360 min, 120 min to 1200 min, 120 min to 600 min, 120 min to 360 min, 180 min to 1200 min, 180 min to 600 min, 180 min to 360 min, or 240 min to 360 min.

The resulting solids can be filtered and dried at an effective temperature, for example in a range of about 80° C. to 180° C. or 100° C. to 180° C., for an effective residence time, for instance in a range of about 30 min to 1800 min, 60 min to 1800 min, 30 min to 600 min, or 60 min to 600 min, to recover composite support particles, formed of the post modified zeolite and a binder, having the active metal loaded on the composite material. Optionally, the separate drying step can be avoided, whereby the composite material with active metal is passed to a thermal treatment step 142 for calcination.

In the thermal treatment step 142, the loaded composite material is subjected to thermal treatment to prepare calcined composite particles with active metal on the composite material. In certain embodiments the thermal treatment at step 142 comprises calcining at effective temperatures, for example in a range of about 400° C. to 800° C., 500° C. to 800° C., 500° C. to 700° C., 500° C. to 650° C., 550° C. to 800° C., 550° C. to 700° C., 550° C. to 650° C., 600° C. to 800° C., or 600° C. to 700° C., and for a time range of about 10 min to 600 min, 10 min to 180 min, 30 min to 600 min, or 30 min to 180 min, to recover the calcined composite particles with active metal on the composite material. In certain embodiments, calcining occurs in the presence of air.

At step 144, the final catalyst product is recovered. In embodiments in which the catalyst is a hydrocracking catalyst, the composite support material having active metals loaded therein generally has a surface area in the range of about 150 m²/g to 500 m²/g. 150 m²/g to 450 m²/g, 200 m²/g to 500 m²/g. 200 m²/g to 450 m²/g, or 300 m²/g to 450 m²/g, and a pore volume in the range of about 0.4 mL/g to 0.8 mL/g. 0.4 mL/g to 0.75 mL/g. 0.4 mL/g to 0.65 mL/g. 0.45 mL/g to 0.8 mL/g, 0.45 mL/g to 0.75 mL/g, or 0.45 mL/g to 0.65 mL/g.

The Hydrocracking Process

A method of hydrocracking a hydrocarbon feed may comprise contacting the hydrocarbon feed with hydrogen and a hydrocracking catalyst under hydrocracking conditions.

The hydrocarbon feed may comprise a heavy hydrocarbon oil, such as one or more of a vacuum gas oil (VGO), a deasphalted oil (DAO), a demetallized oil, a light coker gas oil a heavy coker gas oil, a cycle oil, or a gas oil. The hydrocarbon feed may comprise one or more of middle distillates, naphtha, and bridged diaromatic molecules.

The hydrocarbon feed may contact the hydrocracking catalyst at a hydrogen partial pressure from 5,000 kPa (50 bar) to 25,000 kPa (250 bar). In embodiments, the hydrogen partial pressure may be from 5,000 kPa to 10,000 kPa, from 5,000 kPa to 15,000 kPa, from 5,000 kPa to 20,000 kPa, from 5,000 kPa to 25,000 kPa, from 10,000 kPa to 15,000 kPa, from 10,000 kPa to 20,000 kPa, from 10,000 kPa to 25,000 kPa, from 15,000 kPa to 20,000 kPa, from 15,000 kPa to 25,000 kPa, or from 20,000 kPa to 25,000 kPa.

The hydrocarbon feed may contact the hydrocracking catalyst at a hydrogen feed rate from 500 standard liters of hydrogen to 1 liter of oil (StLt/L) to 2500 StLt/L. For example, the hydrogen feed rate may be from 500 StLt/L to 1000 StLt/L, from 500 StLt/L to 1500 StLt/L, from 500 StLt/L to 2000 StLt/L, from 500 StLt/L to 2500 StLt/L, from 1000 StLt/L to 1500 StLt/L, from 1000 StLt/L to 2000 StLt/L, from 1000 StLt/L to 2500 StLt/L, from 1500 StLt/L to 2000 StLt/L, from 1500 StLt/L to 2500 StLt/L, or from 2000 StLt/L to 2500 StLt/L.

In embodiments, the hydrogen feed rate may be approximated by a multiple of the hydrogen consumption rate. For instance, the hydrogen feed rate may be 2 times, 3 times, or even 4 times the hydrogen consumption rate.

The hydrocarbon feed may contact the hydrocracking catalyst at a temperature of from 100° C. to 550° C. In embodiments, the hydrocarbon feed may contact the hydrocracking catalyst at a temperature of from 100° C. to 200° C., from 100° C. to 300° C., from 100° C. to 400° C., from 100° C. to 500° C. 100° C. to 550° C., from 200° C. to 300° C., from 200° C. to 400° C., from 200° C. to 500° C., from 200° C. to 550° C., from 300° C. to 400° C., from 300° C. to 500° C., from 300° C. to 550° C., from 400° C. to 500° C., from 400° C. to 550° C., from 450° C. to 500° C., or from 500° C. to 550° C.

The hydrocarbon feed may contact the hydrocracking catalyst and the hydrogen in a fixed-bed reactor, an ebullated-bed reactor, a moving-bed reactor, or a slurry-bed reactor.

Aspects

According to a first aspect, a hydrocracking catalyst may comprise an active cracking support; the active cracking support comprises a post-modified zeolite framework having zirconium atoms and titanium atoms substituting for aluminum atoms; wherein: a portion of the zirconium atom are substituted in the post-modified zeolite via 4-coordination; a portion of the zirconium atom are grafted to the post-modified zeolite via 5-coordination; and the titanium atoms are substituted in the post-modified zeolite framework via 4-coordination.

According to a second aspect, in conjunction with the first aspect, the post-modified zeolite may have an ultra-stable Y (USY) framework structure.

According to a third aspect, in conjunction with the first or second aspects, the post-modified zeolite may have a specific surface area of from 600 m$^2$/g to 900 m$^2$/g.

According to a fourth aspect, in conjunction with any one of aspects 1-3, the post-modified zeolite may have a crystal lattice constant of from 2.430 nm to 2.450 nm.

According to a fifth aspect, in conjunction with any one of aspects 1-4, the post-modified zeolite may have a molar ratio of SiO$_2$ to Al$_2$O$_3$ of from 5 to 100.

According to a sixth aspect, in conjunction with any one of aspects 1-5, the hydrocracking catalyst may further comprise a hydrogenative component.

According to a seventh aspect, in conjunction with any one of aspects 1-6, the hydrocracking catalyst may comprise from 0.1 wt. % to 40 wt. % of the hydrogenative component.

According to an eighth aspect, in conjunction with any one of aspects 1-7, the hydrogenative component may comprise at least one metal from IUPAC groups 6 or 8.

According to a ninth aspect, in conjunction with any one of aspects 1-8, the hydrogenative component may comprise one or more metals selected from the group consisting of cobalt, nickel, palladium, platinum, molybdenum, or tungsten.

According to a tenth aspect, in conjunction with any one of aspects 1-9, the zeolite may have an ultra-stable Y (USY) framework structure; a specific surface area of from 600 m$^2$/g to 900 m$^2$/g; a crystal lattice constant of from 2.430 nm to 2.450 nm; and a molar ratio of SiO$_2$ to Al$_2$O$_3$ of from 5 to 100.

According to an eleventh aspect, in conjunction with any one of aspects 1-10, the zeolite may have a Y framework structure or a BEA framework structure.

According to a twelfth aspect, a method of producing a hydrocracking active cracking support may comprise: providing an acidified zeolite suspension comprising a zeolite framework; introducing a titanium compound to the acidified zeolite suspension to isomorphically substitute titanium via 4-coordination onto the zeolite framework, thereby producing a titanium substituted zeolite framework; and then introducing a zirconium compound to the titanium substituted zeolite framework to graft a portion of the zirconium atoms onto the zeolite framework via 5-coordination, and isomorphically substitute a portion of the zirconium atoms via 4-coordination onto the zeolite framework, thereby producing the hydrocracking active cracking support.

According to a thirteenth aspect, in conjunction aspects 12, a time interval between the introduction of the titanium compound and the introduction of the zirconium compound may be from 0.1 hours to 5 hours.

According to a fourteenth aspect, in conjunction with either of aspects 12-13, the acidified suspension may have a liquid/solid ratio of from 5 to 15 L/kg.

According to a fifteenth aspect, in conjunction with any one of aspects 12-14, the acid may be an inorganic acid or an organic acid.

According to a sixteenth aspect, in conjunction with any one of aspects 12-15, a pH of the acidified suspension may be less than 2.

According to a seventeenth aspect, in conjunction with any one of aspects 12-16, the zeolite may be dried and subsequently heat treated at from 500° C. to 700° C.

According to an eighteenth aspect, in conjunction with any one of aspects 12-17, a time interval between the introduction of the titanium compound and the introduction of the zirconium compound may be from 0.1 hours to 5 hours; the acidified suspension may have a liquid/solid ratio of from 5 to 15 L/kg; a pH of the acidified suspension may be less than 2.0; and the zeolite may be heat treated at from 500° C. to 700° C.

According to a nineteenth aspect, a method of hydrocracking a hydrocarbon feed may comprise contacting the hydrocarbon feed with hydrogen and a hydrocracking catalyst under hydrocracking conditions; wherein the hydrocracking catalyst comprises an active cracking support; the active cracking support comprises a post-modified zeolite framework having zirconium atoms and titanium atoms substituting for aluminum atoms; wherein a portion of the zirconium atoms are grafted to the post-modified zeolite framework via 5-coordination; a portion of the zirconium atoms are 4-coordinated in the post-modified zeolite framework; and the titanium atoms are 4-coordinated in post-modified zeolite framework.

According to a twentieth aspect, in conjunction with aspect 19, the hydrocarbon feed may comprise a heavy hydrocarbon oil.

EXAMPLES

The various aspects of the present disclosure will be further clarified by the following examples. The examples are illustrative in nature and should not be understood to limit the subject matter of the present disclosure.

Materials $TiO_2$ Powder: The $TiO_2$ powder was MC-90 (anatase) manufactured by ISHIHARA SANGYO KAISHA, LTD.

Unmodified USY-30 was produced as follows: 50.0 kg of a NaY zeolite (hereinafter, also referred to as "NaY") having a $SiO_2/Al_2O_3$ molar ratio of 5.2, a unit cell dimension (UD) of 2.466 nm, a specific surface area (SA) of 720 m$^2$/g, and a $Na_2O$ content of 13.0% by mass was suspended in 500 L of water having a temperature of 60° C. Then, 14.0 kg of ammonium sulfate was added thereto. The resulting suspension was stirred at 70° C. for 1 hour and filtered. The resulting solid was washed with water. Then the solid was washed with an ammonium sulfate solution of 14.0 kg of ammonium sulfate dissolved in 500 L of water having a temperature of 60° C., washed with 500 L of water having a temperature of 60° C., dried at 130° C. for 20 h, thereby affording about 45 kg of a Y zeolite ($NH_4^{65}Y$) in which 65% of sodium (Na) contained in NaY was ion-exchanged with ammonium ion. $NH_4^{65}Y$ 40 kg was fired in a saturated water vapor atmosphere at 670° C. for 1 h to form a hydrogen-Y zeolite (HY). HY was suspended in 400 L of water having a temperature of 60° C. Then, 49.0 kg of ammonium sulfate was added thereto. The resulting mixture was stirred at 90° C. for 1 h and washed with 200 L of water having a temperature of 60° C. The mixture was then dried at 130° C. for 20 h, thereby affording about 37 kg of a Y zeolite ($NH_4^{95}Y$) in which 95% of Na contained in the initial NaY was ion-exchanged with $NH_4$. $NH_4^{95}Y$ 33.0 kg was fired in a saturated water vapor atmosphere at 650° C. for 1 h, thereby affording about 15 kg of a USY (a) having a $SiO_2/Al_2O_3$ molar ratio of 5.2 and a $Na_2O$ content of 0.60% by mass. Next, 26.0 kg of this USY (a) was suspended in 260 L of water having a temperature of 60° C. After 61.0 kg of 25% sulfuric acid by mass was gradually added to the suspension, the suspension was stirred at 70° C. for 1 hour. The suspension was filtered. The resulting solid was washed with 26 L of deionized water having a temperature of 60° C. and dried at 130° C. for 20 h, thereby affording a USY (b). USY (b) was fired at 600° C. for 1 h, thereby affording about 17 kg of USY (c) with a silica-alumina ratio of 30.

Zirconium modified USY-30 was prepared as follows. 1 kg of USY-30 (as produced in this section) was suspended in 10 L of water of 25° C., and the pH of the solution was adjusted to 1.6 by the addition of 25% by mass sulfuric acid. Zirconium sulfate of 18% by mass (86 g) added to the suspension and mixed at room temperature for 5 h. Then, the pH was adjusted to 7.2 by aqueous ammonia of 15% by mass, and the suspension was stirred at room temperature for 1 hour and then filtrated. The filtrate was washed with 10 L of water and dried at 130° C. for 20 h to obtain about 1 kg of a Zirconium modified USY-30.

Titanium modified USY-30 with the titanium being 4-coordinated to the framework was prepared as follows. 1 kg of USY-30 (as produced in this section) was suspended in 10 L of water of 25° C., and the pH of the solution was adjusted to 1.6 by the addition of 25% by mass sulfuric acid. Titanyl sulfate of 33% by mass (60 g) was added to the suspension and mixed at room temperature for 5 h. Then, the pH was adjusted to 7.2 by aqueous ammonia of 15% by mass, and the suspension was stirred at room temperature for 1 hour and then filtrated. The filtrate was washed with 10 L of water and dried at 130° C. for 20 h to obtain about 1 kg of a titanium modified USY-30.

Titanium and zirconium modified USY-30 with zirconium being 4-coordinated and 5-coordinated to the framework and titanium being 4-coordinated to the framework was prepared as follows. 1 kg of USY-30 (as produced in this section) was suspended in 10 L of water of 25° C., and the pH of the solution was adjusted to 1.6 by the addition of 25% by mass sulfuric acid. Titanyl sulfate of 33% by mass (60 g) was added first and mixed for 1 h and then zirconium sulfate of 18% by mass (86 g) added to the suspension and mixed at room temperature for 5 h. Then, the pH was adjusted to 7.2 by aqueous ammonia of 15% by mass, and the suspension was stirred at room temperature for 1 hour and then filtrated. The filtrate was washed with 10 L of water and dried at 130° C. for 20 h to obtain about 1 kg of a TiZr—USY.

Example 1: UV-Vis Spectroscopy

Figure 2:
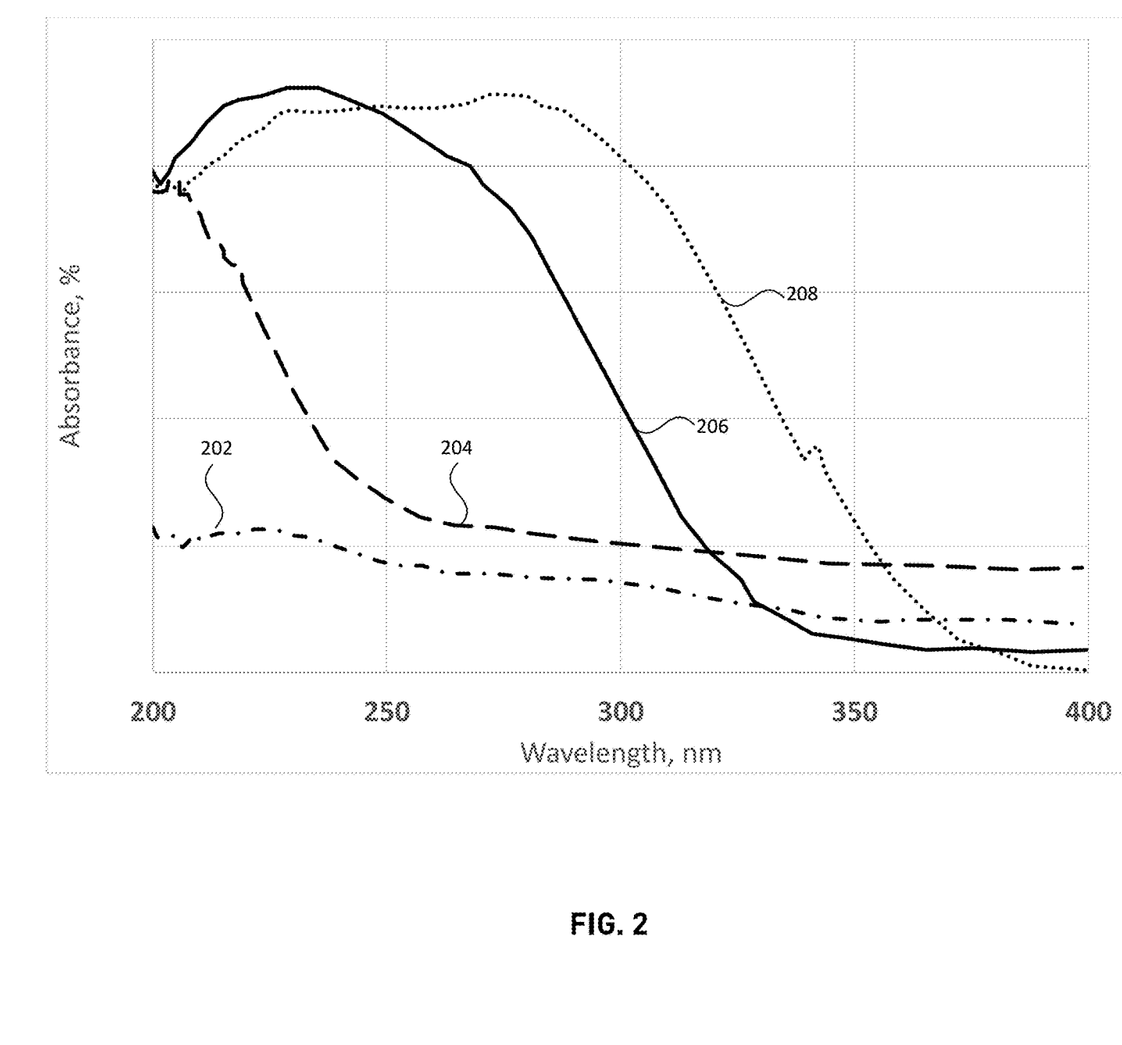
FIG. 2 graphically depicts a UV-vis spectrum of a USY zeolites and modified USY-zeolites, in accordance with some embodiments of the present disclosure.

FIG. 2 depicts ultraviolet-visible light (UV-Vis) spectroscopy of the unmodified USY-30 zeolite 202; the zirconium modified USY 204; the titanium modified USY 206; and the titanium and zirconium modified USY 208 with titanium and zirconium being 4-coordinated and 5-coordinated to the framework.

As can be seen from FIG. 2, the titanium modified USY 206 and the zirconium modified USY 204 show peaks in the 200 nm to 300 nm range. According to the literature, the 200 to 210 nm peak is attributed to four-coordinated Zr atom and 220 to 230 peak is attributed to four coordinated Ti atom. The unmodified USY-30 202 does not include peaks in this range, while the titanium and zirconium modified USY-30 208 does include these peaks. Therefore, it can be seen from FIG. 2 that at least a part of the Ti and Zr atoms added to USY zeolite are 4-coordinated into the USY zeolite lattice of the titanium and zirconium modified USY-30 208.

Example 2: XAFS Modeling

Figure 3:
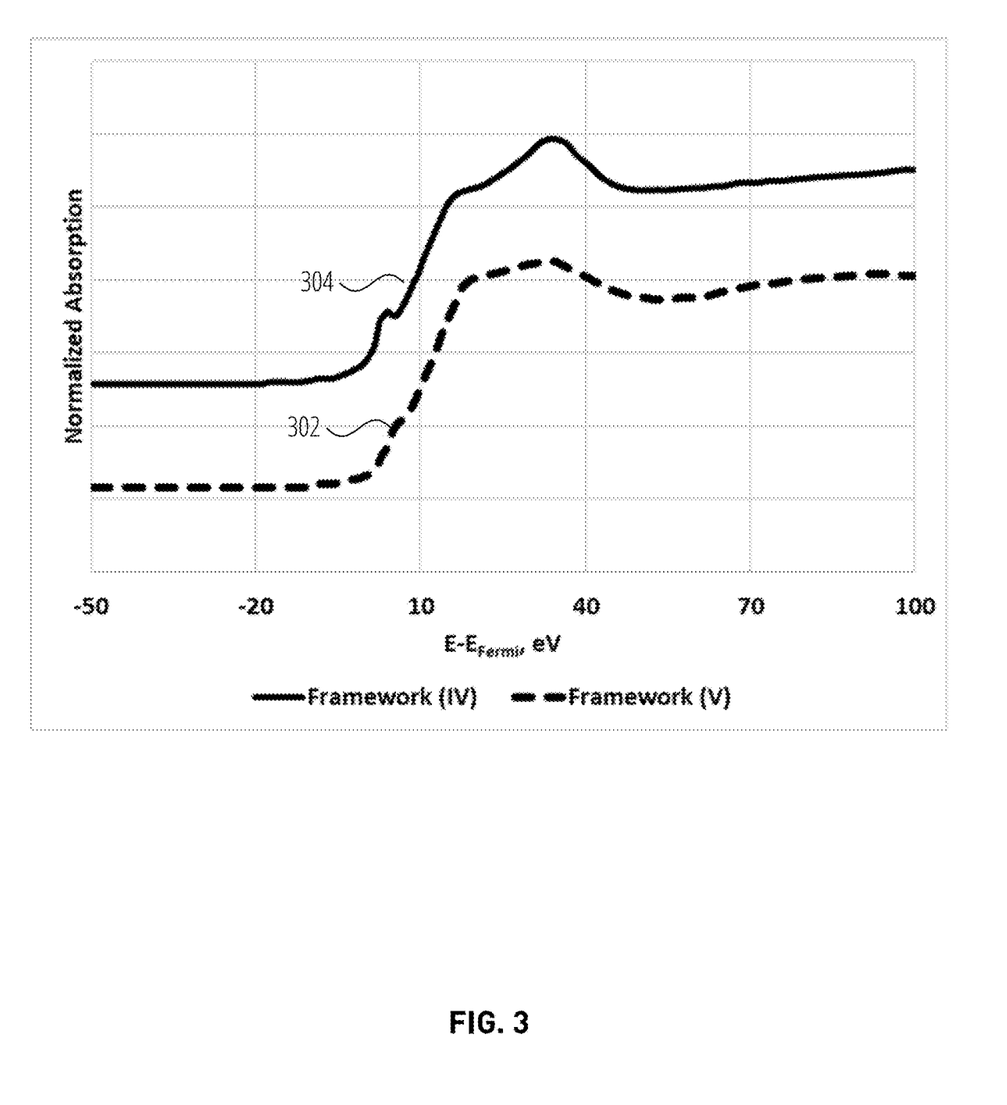
FIG. 3 graphically depicts modeled XAFS spectra of a USY-zeolite which includes 4-coordinated or 5-coordinated Zr, according to some embodiments of the present disclosure.

The XAFS spectra of a USY zeolite with Zr 4-coordinated and of a USY zeolite with Zr 5-coordinated to the zeolite frameworks were modeled And the results are shown in FIG. 3.

As depicted in FIG. 3, the spectra of Zr-4-coordinated USY zeolite 304 was substantially different from that of the Zr-5-coordinated USY-zeolite 302. Specifically, the characteristic signal showing the presence of 5-coordinated USY-zeolite is the peaks at about 5 E-$E_{Fermi}$ eV.

Example 3: XAFS Testing

Figure 4:
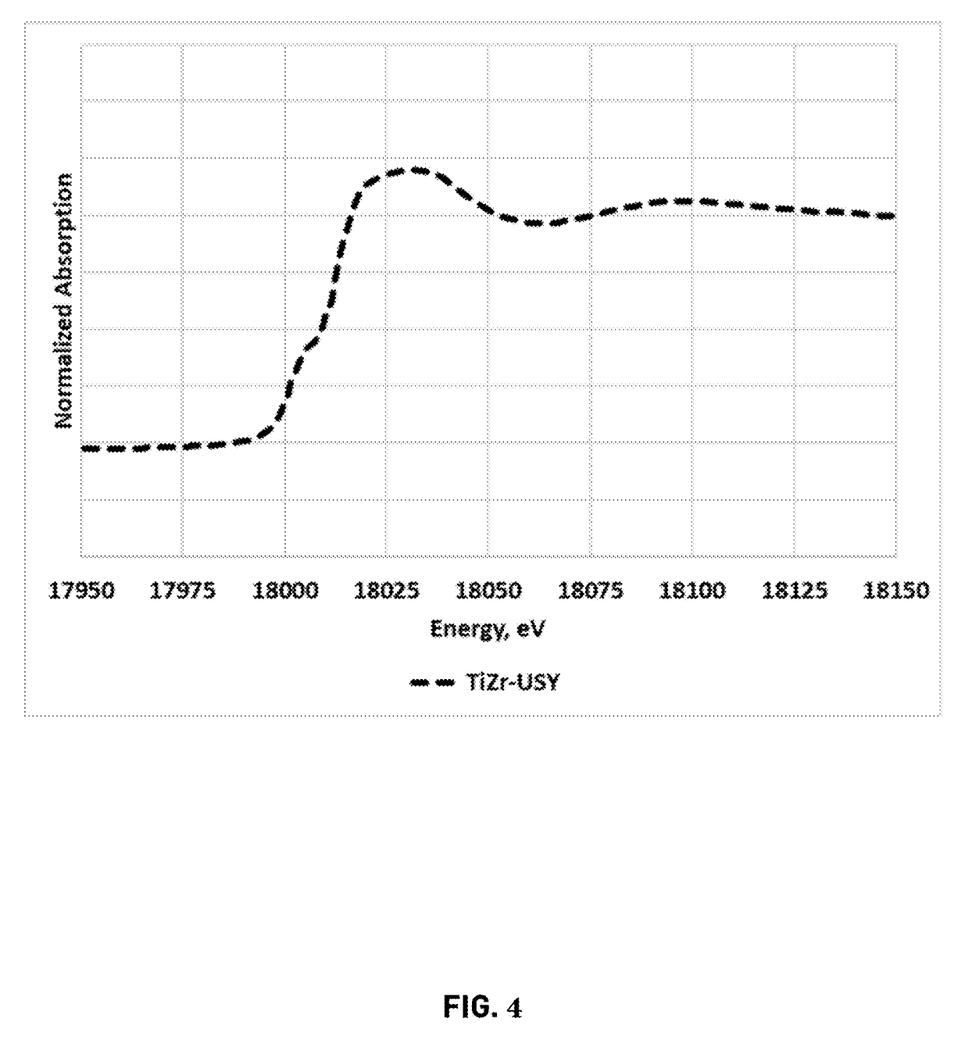
FIG. 4 graphically illustrates an XAFS spectrum of the post-modified zeolite of some embodiments of the present disclosure.

The titanium and zirconium modified USY-30 was then subjected to XAFS testing. As can be seen in FIG. 4, the spectrum of the titanium and zirconium modified USY-30 was similar to that of the 5-coordinated modeling shown in FIG. 3. This confirms the presence of zirconium atoms having 5-coordination.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A hydrocracking catalyst comprising an active cracking support;
the active cracking support comprises a post-modified zeolite framework having zirconium atoms and titanium atoms substituting for aluminum atoms; wherein:
the post-modified zeolite has an ultra-stable Y (USY) framework structure;
a portion of the zirconium atom are substituted in the post-modified zeolite via 4-coordination;
a portion of the zirconium atom are grafted to the post-modified zeolite via 5-coordination; and
the titanium atoms are substituted in the post-modified zeolite framework via 4-coordination.

2. The hydrocracking catalyst of claim 1, wherein the post-modified zeolite has a specific surface area of from 600 m²/g to 900 m²/g.

3. The hydrocracking catalyst of claim 1, wherein the post-modified zeolite has a crystal lattice constant of from 2.430 nm to 2.450 nm.

4. The hydrocracking catalyst of claim 1, wherein the post-modified zeolite has a molar ratio of $SiO_2$ to $Al_2O_3$ of from 5 to 100.

5. The hydrocracking catalyst of claim 1, wherein the hydrocracking catalyst further comprises a hydrogenative component.

6. The hydrocracking catalyst of claim 5, wherein the hydrocracking catalyst comprises from 0.1 wt. % to 40 wt. % of the hydrogenative component.

7. The hydrocracking catalyst of claim 5, wherein the hydrogenative component comprises at least one metal from IUPAC groups 6 or 8.

8. The hydrocracking catalyst of claim 5, wherein the hydrogenative component comprises one or more metals selected from the group consisting of cobalt, nickel, palladium, platinum, molybdenum, or tungsten.

9. The hydrocracking catalyst of claim 1, wherein the zeolite has a specific surface area of from 600 m²/g to 900 m²/g; a crystal lattice constant of from 2.430 nm to 2.450 nm; and a molar ratio of $SiO_2$ to $Al_2O_3$ of from 5 to 100.

10. A method of producing a hydrocracking active cracking support comprising
providing an acidified zeolite suspension comprising a zeolite framework;
introducing a titanium compound to the acidified zeolite suspension to isomorphically substitute titanium via 4-coordination onto the zeolite framework, thereby producing a titanium substituted zeolite framework; and
then introducing a zirconium compound to the titanium substituted zeolite framework to
graft a portion of the zirconium atoms onto the zeolite framework via 5-coordination, and
isomorphically substitute a portion of the zirconium atoms via 4-coordination onto the zeolite framework, thereby producing the hydrocracking active cracking support, wherein a time interval between the introduction of the titanium compound and the introduction of the zirconium compound is at least 0.5 hours.

11. The method of claim 10, wherein a time interval between the introduction of the titanium compound and the introduction of the zirconium compound is from 0.5 hours to 5 hours.

12. The method of claim 10, wherein the acidified suspension has a liquid/solid mass ratio of from 5 to 15.

13. The method of claim 10, wherein the acid is an inorganic acid or an organic acid.

14. The method of claim 10, wherein a pH of the acidified suspension is less than 2.

15. The method of claim 10, wherein the zeolite is dried and subsequently heat treated at from 500° C. to 700° C.

16. The method of claim 10, wherein:
a time interval between the introduction of the titanium compound and the introduction of the zirconium compound is from 0.5 hours to 5 hours;
the acidified suspension has a liquid/solid mass ratio of from 5 to 15;
a pH of the acidified suspension is less than 2.0; and
the zeolite is heat treated at from 500° C. to 700° C.

17. A method of hydrocracking a hydrocarbon feed, the method comprising contacting the hydrocarbon feed with hydrogen and a hydrocracking catalyst under hydrocracking conditions; wherein the hydrocracking catalyst comprises an active cracking support;
the active cracking support comprises a post-modified zeolite framework having zirconium atoms and titanium atoms substituting for aluminum atoms; wherein
the post-modified zeolite has an ultra-stable Y (USY) framework structure;
a portion of the zirconium atoms are grafted to the post-modified zeolite framework via 5-coordination;
a portion of the zirconium atoms are 4-coordinated in the post-modified zeolite framework; and
the titanium atoms are 4-coordinated in post-modified zeolite framework.

18. The method of claim 17, wherein the hydrocarbon feed comprises a heavy hydrocarbon oil.

19. A hydrocracking catalyst comprising the hydrocracking active cracking support of claim 10.

20. The method of claim 10, wherein the zeolite framework has an ultra-stable Y (USY) framework structure.

* * * * *